United States Patent
Da Silva Oliveira

(10) Patent No.: US 6,551,005 B2
(45) Date of Patent: Apr. 22, 2003

(54) ASSEMBLY FOR THE RESTRICTION OF THE MOVEMENT OF THE BALL JOINT UTILIZED IN AUTOMOBILE AND THE LIKE

(75) Inventor: Orivaldo Da Silva Oliveira, Sao Paulo (BR)

(73) Assignee: Dana Industrial S/A, Sao Paulo (BR)

( * ) Notice: Subject to any disclaimer, the term of this patent is extended or adjusted under 35 U.S.C. 154(b) by 0 days.

(21) Appl. No.: 09/916,654

(22) Filed: Jul. 30, 2001

(65) Prior Publication Data

US 2002/0018692 A1 Feb. 14, 2002

(30) Foreign Application Priority Data

Jul. 28, 2000 (BR) .......................................... PI0003430

(51) Int. Cl.[7] ................................................. F16C 11/06
(52) U.S. Cl. ....................... 403/114; 403/115; 403/147
(58) Field of Search ................................ 403/114, 115, 403/134, 147, 135

(56) References Cited

U.S. PATENT DOCUMENTS

| 2,828,984 A | * | 4/1958 | Chow .................... 403/134 X |
| 2,957,714 A | * | 10/1960 | Langen ...................... 403/135 |
| 3,052,477 A | * | 9/1962 | Parker .................... 403/134 X |
| 4,332,500 A | * | 6/1982 | Smith, Jr. et al. ........... 403/114 |
| 5,609,433 A | * | 3/1997 | Pazdirek et al. ........ 403/135 X |
| 5,927,891 A | * | 7/1999 | Trumbower et al. ........ 403/114 |
| 6,398,446 B1 | * | 6/2002 | Pazdirek et al. ............ 403/134 |

* cited by examiner

Primary Examiner—Lynne H. Browne
Assistant Examiner—David E. Bochna
(74) Attorney, Agent, or Firm—Liniak, Berenato & White

(57) ABSTRACT

An assembly for restricting movement of the ball joint utilized in automotive vehicles and the like, comprising a socket (2), a bearing (3), an "O" ring (4), two retaining rings (5) and one protection cap (6). The bearing (3) functions to restrict movement of the ball pin to prevent the fall of the steering bar (7) of vehicles due to the fact that the bar (7) is long and curved. An o-ring (4) has a function to make the sealing between the bearing (3) and the ball pin. The retaining rings (5) serving to lock the protective cap (6) to prevent the entry of dust and other agents in the joint assembly, avoiding possible damages to the movable components of the same. The matching surfaces of the socket body and the bearing contact to limit relative movement therebetween, so that the movements of the suspension of the vehicles remain free, locking the bar in the sense of rotation around the line of action of the ball.

15 Claims, 7 Drawing Sheets

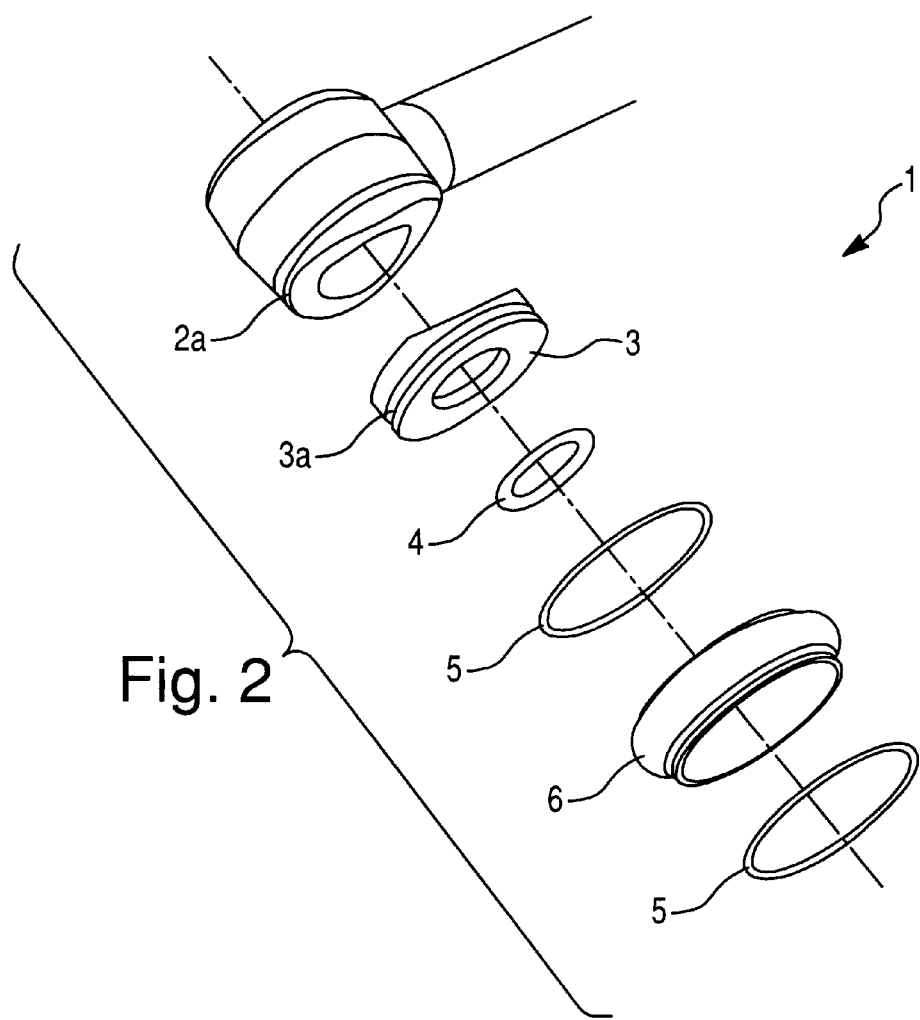

ASSEMBLY FOR THE RESTRICTION OF THE MOVEMENT OF THE BALL JOINT UTILIZED IN AUTOMOBILE AND THE LIKE

BACKGROUND OF THE INVENTION

1. Field of the Invention

The invention relates to a ball joint assembly designed to restrict movement of the ball joint; and particularly, the utilization in any type of automotive vehicle of a ball joint assembly, which limits the rotational movement of the steering bar joint.

2. Description of Related Art

In the current state of the art and as it is generally known, the steering bars utilized in automotive vehicles present several problems of technical order and of comfort. For example, because the steering bars are long and heavy, their trend is to rotate around the line of action among the balls of the respective joint. As a function of its own weight and by remaining in a position that, when the vehicle is in continuous use, the steering bar will be submitted to great stresses, mainly at the steering pins that support the respective steering bar, as well as at the elongation mouth of the ball pin. Thus, the structure may cause noises and breakages of the same and also cause a premature wearing out of the ball bearing that supports and holds the steering bar. Also, this type of problem occurs in all types of vehicles that use this type of curved bar, whether they are tractors, trucks, automobiles, etc.

SUMMARY OF THE INVENTION

To solve and overcome the aforementioned problem, an assembly for restriction of the movements of the ball joint utilized in automotive vehicles was created and developed, which limits the rotational movement of the steering bar avoiding the breakage of the same and fully eliminating the noises produced by it as well the premature wearing out of the components.

BRIEF DESCRIPTION OF THE DRAWINGS

In order that one may obtain a visualization of the assembly for restriction of movements of the ball joint utilized in automotive vehicles and the like, now being described and object of the present application, is made reference to the attached illustrative drawings, in which:

FIG. 2 shows a view in exploded perspective of the assembly.

DETAILED DESCRIPTION OF THE PREFERRED EMBODIMENTS

Figure 1:
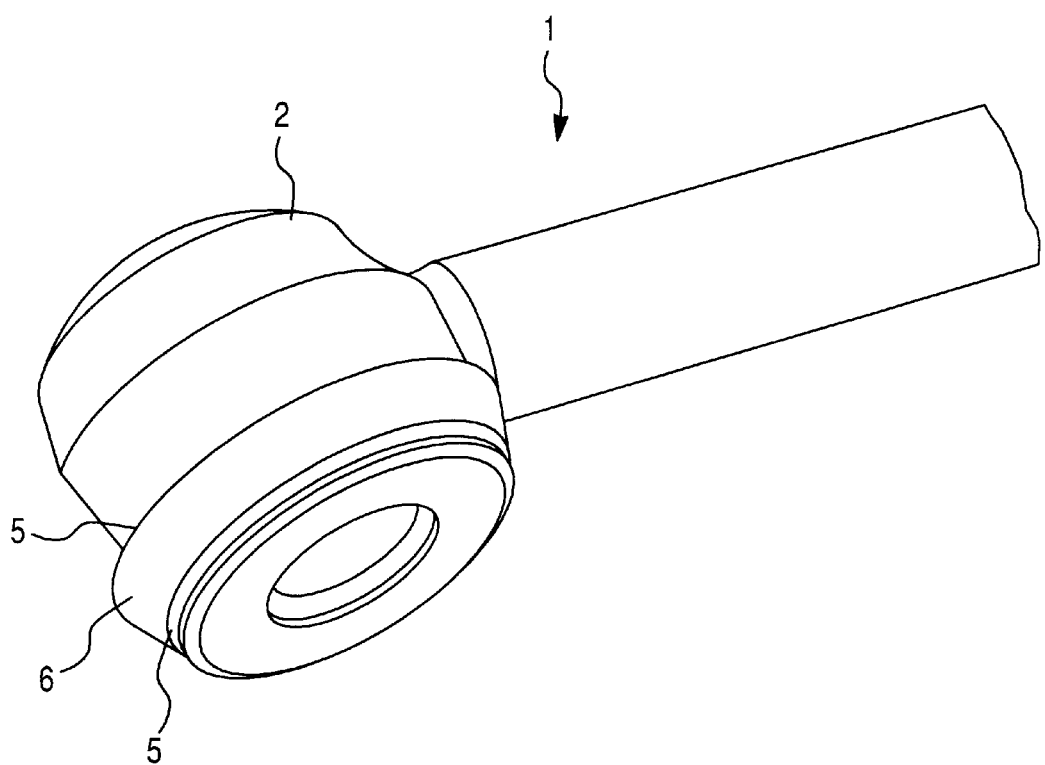
FIG. 1 is a view in perspective of the complete mounted assembly.

As it may be inferred from the accompanying drawings which form an integral part of this application for an assembly that restrictions movement of the ball joint utilized in automotive vehicles, the assembly 1 of this invention comprises a two section support denominated socket 2, a bearing 3, an "O" ring 4, two restraining rings 5 and one protective cap or boot seal 6.

Figure 2A:
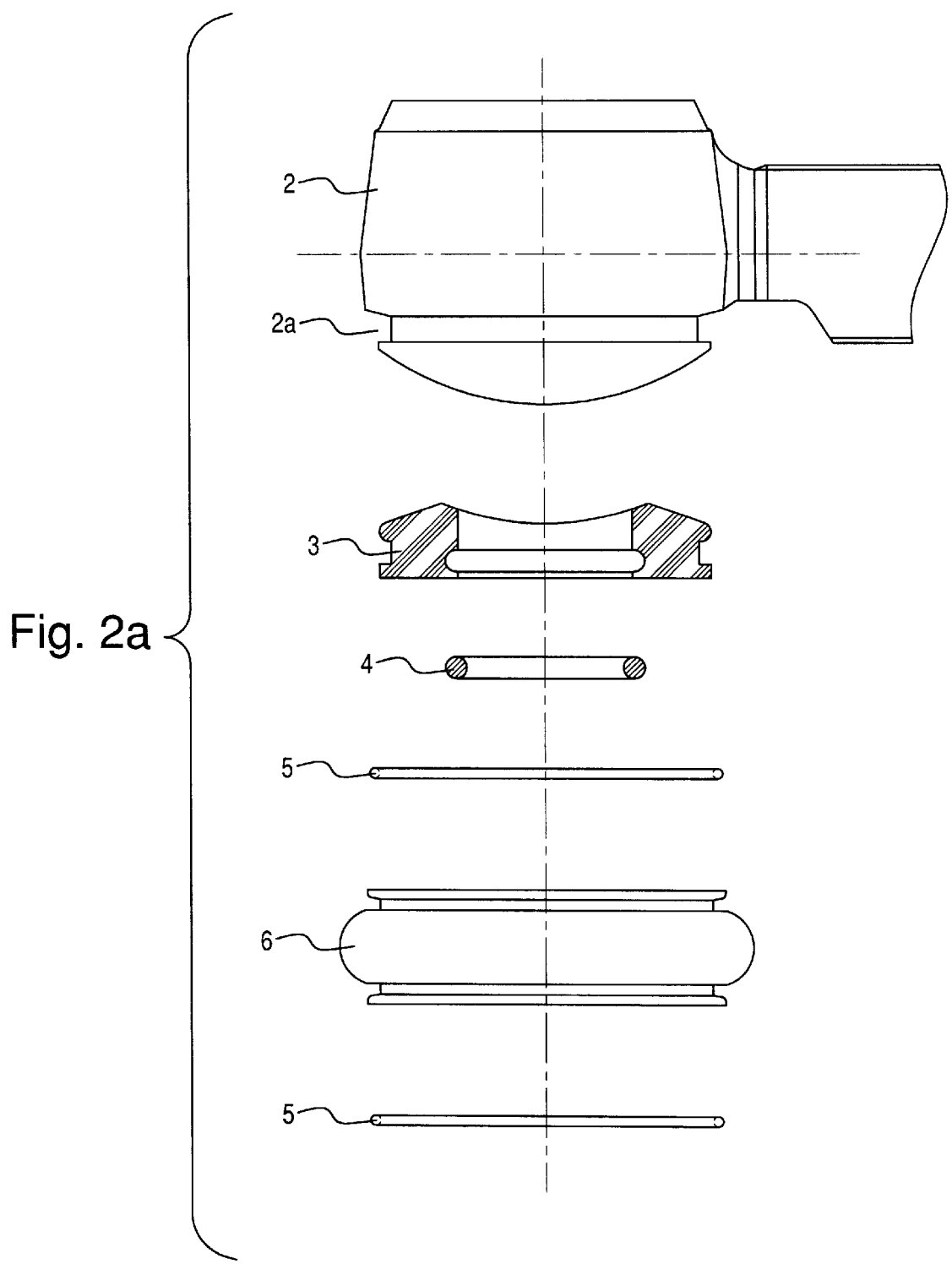
FIG. 2a is an exploded sectional view of the primary components of the assembly.
Figure 3:
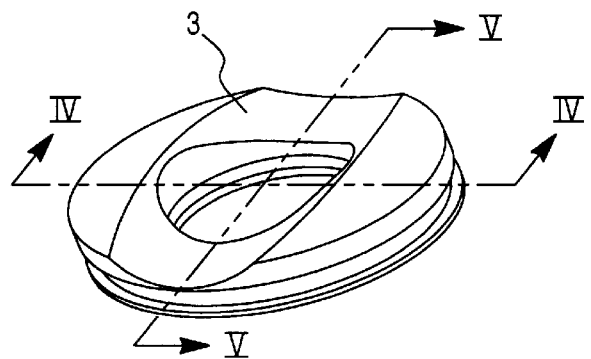
FIG. 3 represents a view in perspective of the bearing.
Figure 6:
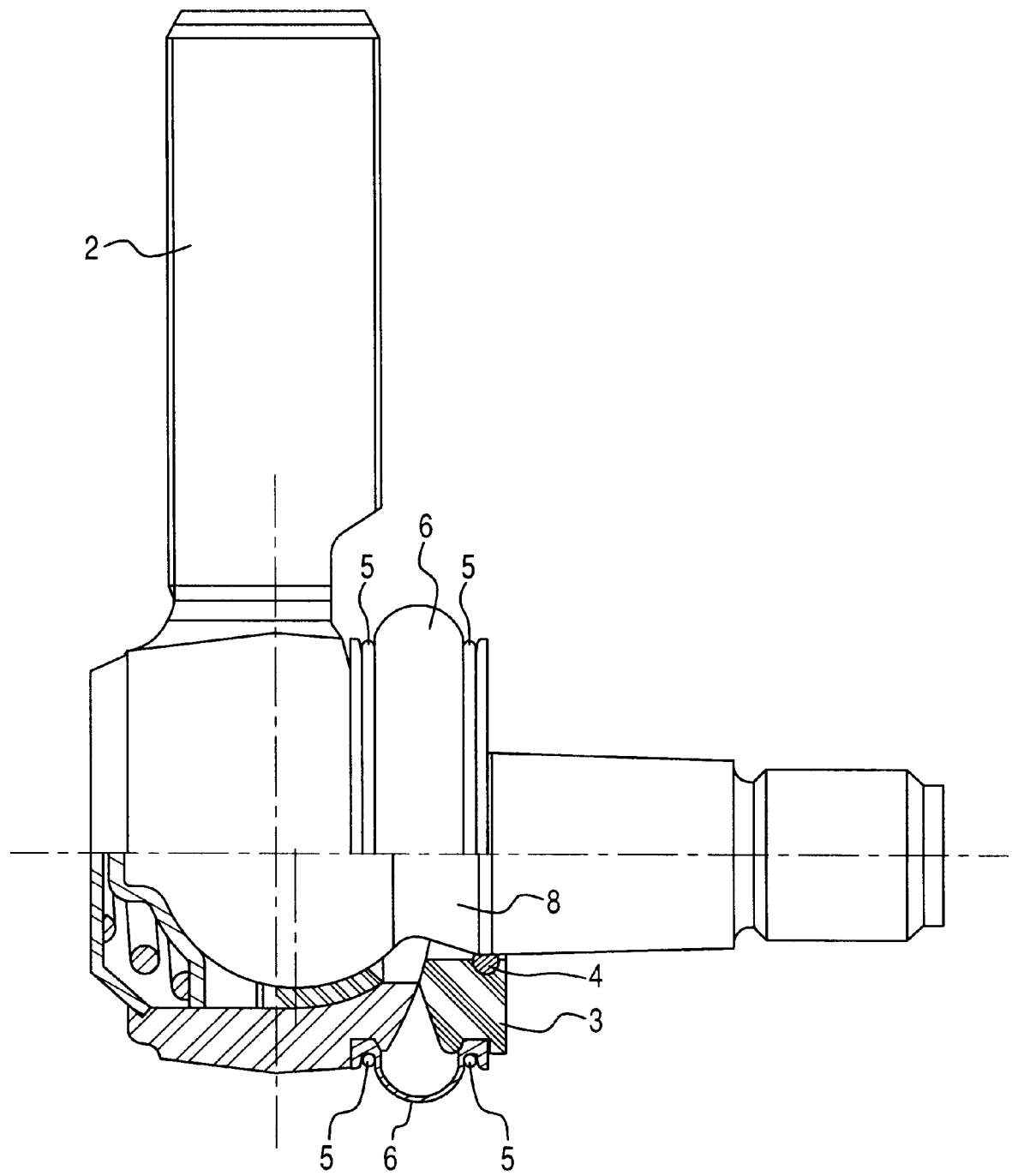
FIG. 6 shows a cross section view of the assembly of FIG. 1.

With reference to FIGS. 2, 2a, and 6, the socket 2 and bearing 3 are formed with a peripheral groove 2a, 3a adapted to receive a lip of the boot seal 6. A pair of restraining rings 5 retain the boot seal 6 in sealing relation to the socket 2 and bearing 3 as shown in FIG. 6 while permitting relative movement therebetween.

It is noteworthy to emphasize that the scored part of the support, herein denominated socket 2 and that remains in mechanical contact with the bearing 3, may optionally be or not an integral part of the assembly 1.

The bearing 3 has as objective and function to restrict one of the movements of the ball pin so as to avoid the drop of the steering bar (7), due that the same, given the design characteristics, is long and curved with the purpose of maintaining the entrance of the wheels when performing the maneuvering process with the vehicle, specifically when the wheels are steered, being that the "O" ring (4) has as function to effect the sealing between the bearing (3) and the ball pin 8.

The function of the straining rings (5) is to lock or retain the protective cap or boot seal 6, avoiding the penetration of dust and other agents in the joint assembly, avoiding possible damages to the pieces or movable components therein, preserving and increasing its working life.

Figure 4:
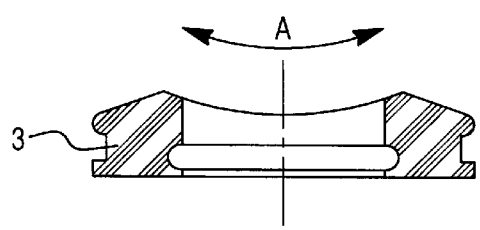
FIG. 4 corresponds to the cross section view of the bearing taken along line IV—IV of FIG. 3.
Figure 5:
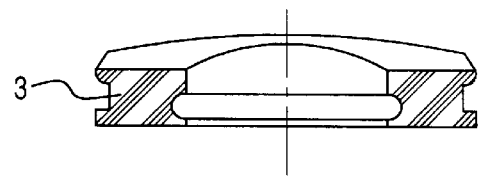
FIG. 5 illustrates a view in longitudinal section of the bearing taken along line V—V of FIG. 3.
Figure 7:
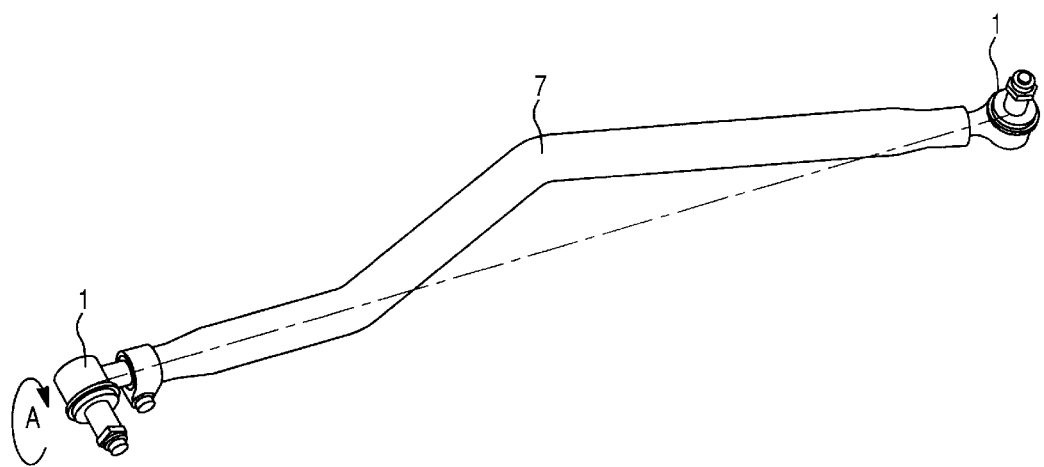
FIG. 7 shows a view in perspective of a steering bar provided with the herein presented assembly.
Figure 8:
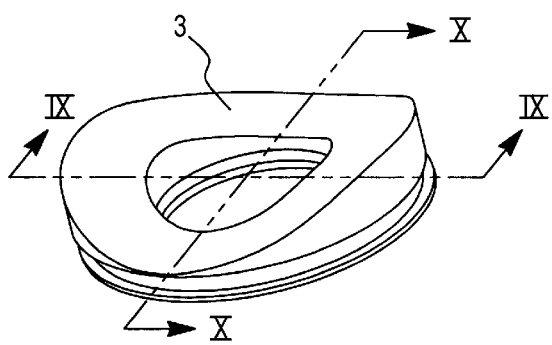
FIG. 8 represents a view in perspective of an alternate design of the bearing.
Figure 9:
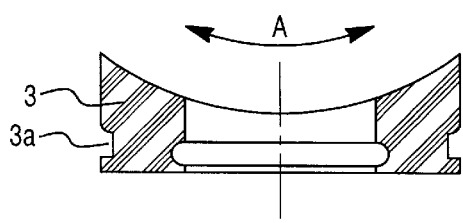
FIG. 9 corresponds to the cross section view of the bearing taken along line IX—IX of FIG. 8.
Figure 10:
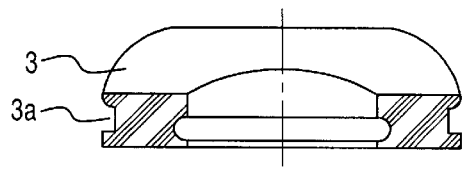
FIG. 10 illustrates a view in longitudinal section of the bearing taken along line X—X of FIG. 8.

The lock of the assembly for restriction of movement of the ball joint to one specific direction indicated by the arrow 'A' in FIGS. 4 and 7 is formed by two pieces, one of them being fixed to the pivoting body bar 7 and the other being placed in contact with the first, so that the movements of the suspension of the vehicles remain free, only locking the bar 7 in the sense of rotation around the line of action of the ball.

The purpose of this assembly 1 for restriction of one of the movements of the ball joint utilized in automotive vehicles is to avoid the wearing out and the noises derived from the steering bar 7, due to, when the bar 7 tends to hang as a result of its own weight, wears out the same causing dislocations, which cause mechanical problems and, consequently, noises.

It should be stressed that the rigid and elastic materials utilized in the manufacturing of this assembly for restriction of one of the movements of the ball joint are of different type, being that the metallic components may be of carbon steel, synthetic material, engineering plastics as well as of any and all material specific for this application, while among the elastic components, both the protective cap or boot seal 6 and the "O" ring 4, may be made of rubber, resins and other appropriate material, being that in all the cases, the materials utilized in the manufacturing of the components must comply with the requirements of use of the stresses originated from the vehicle, and that shall be in conformity with the norms in force applicable to the respective materials.

The parameters described hereinbefore will serve for all and any types of assemblies for restriction of movements of the ball joint, due that the assembly 1 and in accordance to the different types and models of automotive vehicles, may be manufactured in different sizes, but always with identical purposes.

It is verified, by everything that has been described and illustrated above, that is perfectly fitted within the norms that rule the novelty of invention, as it perfectly fills an important gap existent in the national and international market, deserving by what was explained and as a consequence, the respective protection.

What is claimed is:

1. An assembly for restricting movement of a ball joint for use in a vehicle, said assembly comprising:
    a socket member having a first contact surface defining a convex surface in cross section,
    a bearing member having a second contact surface defining a concave surface in cross section and configured to substantially match said first contact surface, and
    a ball received in said socket member and having a post extending through said bearing member,
    wherein said bearing member limits movement of said ball and post along a single direction of movement.

2. The assembly according to claim 1, further comprising a boot seal sealingly affixed at one end to said socket member and sealing affixed at an opposite end to said bearing member thereby preventing penetration of dust and other agents in the assembly, avoiding possible damages to the assembly, and preserving and increasing a working life of said assembly.

3. The assembly according to claim 1, further comprising a sealing ring interposed between said bearing member and said post.

4. The assembly according to claim 2, further comprising first and second retaining rings retaining said boot seal at said one end to said socket member and at said opposite end to said bearing member, respectively.

5. The assembly according to claim 1, wherein said second contact surface defines a trough extending perpendicular to said single direction of movement.

6. The assembly according to claim 5, wherein said first contact surface defines a ridge extending perpendicular to said single direction of movement, said ridge fitting into and contacting said trough.

7. The assembly according to claim 6, wherein pivotal movement of said ball and said post are restricted in a direction defined by said trough and said ridge.

8. An assembly for restricting movement of a ball joint for use in a vehicle, said assembly comprising:
    a socket member having a first contact surface,
    a bearing member having a second contact surface configured to substantially match said first contact surface, and
    a ball received in said socket member, said ball having a post extending through said bearing member,
    wherein said bearing member limits movement of said post relative to said socket member, and wherein said second contact surface defines a trough extending perpendicular to a single direction of movement.

9. The assembly according to claim 8, further comprising a boot seal sealingly affixed at one end to said socket member and sealing affixed at an opposite end to said bearing member thereby preventing penetration of dust and other agents in the assembly, avoiding possible damages to the assembly, and preserving and increasing a working life of said assembly.

10. The assembly according to claim 9, further comprising first and second retaining rings retaining said boot seal at said one end to said socket member and at said opposite end to said bearing member, respectively.

11. The assembly according to claim 8, further comprising a sealing ring interposed between said bearing member and said post.

12. The assembly according to claim 8, wherein said first contact surface defines a ridge extending perpendicular to said single direction of movement, said ridge fitting into and contacting said trough.

13. The assembly according to claim 12, wherein pivotal movement of said ball and said post are restricted in a direction defined by said trough and said ridge.

14. The assembly according to claim 8, wherein said first contact surface defines a convex surface in cross section.

15. The assembly according to claim 8, wherein said second contact surface defines a concave surface in cross section.

* * * * *